(12) United States Patent
Kooken et al.

(10) Patent No.: US 11,897,061 B2
(45) Date of Patent: Feb. 13, 2024

(54) ENGINE DRIVEN WELDER (71) Applicant: Lincoln Global, Inc., Santa Fe Springs, CA (US)

(72) Inventors: Todd E. Kooken, Solon, OH (US); Edward A. Enyedy, Eastlake, OH (US); Adam M. Hruska, Chardon, OH (US); Erik C. Miller, Mentor, OH (US); Steven R. Sumner, Brunswick, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 282 days.

(21) Appl. No.: 17/381,400

(22) Filed: Jul. 21, 2021

(65) Prior Publication Data
US 2023/0023065 A1    Jan. 26, 2023

(51) Int. Cl.
| | |
|---|---|
| *B23K 9/10* | (2006.01) |
| *F16M 5/00* | (2006.01) |
| *F04C 15/00* | (2006.01) |
| *F04C 3/00* | (2006.01) |
| *F16M 7/00* | (2006.01) |
| *B23K 9/16* | (2006.01) |
| *F04C 29/00* | (2006.01) |

(52) U.S. Cl.
CPC .............. *B23K 9/1006* (2013.01); *B23K 9/16* (2013.01); *F04C 3/00* (2013.01); *F04C 15/0057* (2013.01); *F16M 5/00* (2013.01); *F16M 7/00* (2013.01); *F04C 29/005* (2013.01)

(58) Field of Classification Search
CPC .......... B23K 9/1006; B23K 9/16; B23K 9/18; F04C 15/0057; F04C 18/16; F04C 18/344; F04C 2210/221; F04C 28/08; F04C 29/005; F04C 3/00; F16M 5/00; F16M 7/00

See application file for complete search history.

(56) References Cited

U.S. PATENT DOCUMENTS

| | | | |
|---|---|---|---|
| 4,506,522 A | 3/1985 | Swaney et al. | |
| 5,269,662 A | 12/1993 | Denton et al. | |
| 2001/0054287 A1 | 12/2001 | Hoecker et al. | |
| 2003/0155339 A1 | 8/2003 | Gitter et al. | |
| 2005/0013704 A1 | 1/2005 | Dyson et al. | |
| 2005/0151374 A1* | 7/2005 | Ambrose | B23K 9/323 290/1 A |
| 2008/0264919 A1* | 10/2008 | Helf | F04C 18/16 417/313 |
| 2019/0160579 A1 | 5/2019 | Hruska et al. | |
| 2019/0316588 A1 | 10/2019 | Makosky et al. | |
| 2021/0017902 A1 | 1/2021 | Enyedy et al. | |

* cited by examiner

*Primary Examiner* — Dana Ross
*Assistant Examiner* — Joe E Mills, Jr.
(74) *Attorney, Agent, or Firm* — Brad C. Spencer (57) ABSTRACT

A welding machine includes a welding power supply that generates a welding waveform during a welding operation, an internal combustion engine, and a generator that is operatively connected to the welding power supply to supply electrical energy to the welding power supply. The generator includes a rotor shaft driven by the internal combustion engine, and an end casting located at an end of the generator opposite the internal combustion engine. A rotary screw compressor is mounted to the end casting of the generator. A clutch mechanism couples the rotor shaft to the rotary screw compressor to selectively drive the rotary screw compressor by the rotor shaft.

18 Claims, 9 Drawing Sheets

ENGINE DRIVEN WELDER

BACKGROUND OF THE INVENTION

Field of the Invention

The present disclosure relates to engine driven generators, and in particular to engine driven arc generation devices, such as welders and plasma cutters.

Description of Related Art

Engine driven welders include an internal combustion engine, such as a diesel, gasoline or liquefied petroleum gas (LPG) engine. The engine drives a generator, and the generator supplies electrical power to a welding power supply that outputs a welding current and voltage (e.g., a welding waveform) during a welding operation. Engine driven welders can include auxiliary loads or equipment that are powered by the engine. One example of such an auxiliary load is an air compressor, such as a rotary screw compressor. An air compressor may be driven by the engine via a belt or chain. When driven by a belt, a tensioner may be present to maintain belt tension. However, relative motion between the drive for the air compressor and the air compressor itself, such as due to engine vibration, is generally unfavorable to maintaining a desired tension on the drive belt.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a welding machine. The welding machine includes a welding power supply that generates a welding waveform during a welding operation, an internal combustion engine, and a generator that is operatively connected to the welding power supply to supply electrical energy to the welding power supply. The generator includes a rotor shaft driven by the internal combustion engine, and an end casting located at an end of the generator opposite the internal combustion engine. A rotary screw compressor is mounted to the end casting of the generator. A clutch mechanism couples the rotor shaft to the rotary screw compressor to selectively drive the rotary screw compressor by the rotor shaft.

In accordance with another aspect of the present invention, provided is a welding machine. The welding machine includes a chassis structure, a welding power supply that generates a welding waveform during a welding operation, an internal combustion engine, and a generator that is operatively connected to the welding power supply to supply electrical energy to the welding power supply. The generator includes a rotor shaft driven by the internal combustion engine, and an end casting located at an end of the generator opposite the internal combustion engine. A rotary screw compressor is mounted to the end casting of the generator. A selectively engageable pulley couples the rotor shaft to the rotary screw compressor to selectively drive the rotary screw compressor by the rotor shaft. A vibration isolator isolates both of the generator and the rotary screw compressor from the chassis structure.

In accordance with another aspect of the present invention, provided is a welding machine. The welding machine includes a welding power supply that generates a welding waveform during a welding operation, an internal combustion engine, and a generator that is operatively connected to the welding power supply to supply electrical energy to the welding power supply. The generator includes a rotor shaft driven by the internal combustion engine, and an end casting located at a distal end of the generator opposite the internal combustion engine. The end casting includes a rotor shaft bearing that supports the rotor shaft. A rotary screw compressor is mounted to the end casting of the generator. A clutch mechanism on the rotary screw compressor couples the rotor shaft to the rotary screw compressor to selectively drive the rotary screw compressor by the rotor shaft.

DETAILED DESCRIPTION OF THE INVENTION

Embodiments of the present invention relate to engine driven welders. The embodiments will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

Embodiments of the present invention are described herein in the context of a welding system. Example welding systems can perform one or more of the following welding processes: shielded metal arc welding (SMAW), gas metal arc welding (GMAW), flux-cored arc welding (FCAW), metal-cored arc welding (MCAW), gas tungsten arc welding (GTAW) and the like. In addition to welding operations, embodiments of the present invention can be used in welding-type processes, such as additive manufacturing, hard-facing, and arc gouging processes. Thus, the term "welding" is to be interpreted to include such welding-type processes. Because such systems and processes are well known, they will not be described in detail herein.

Figure 1:
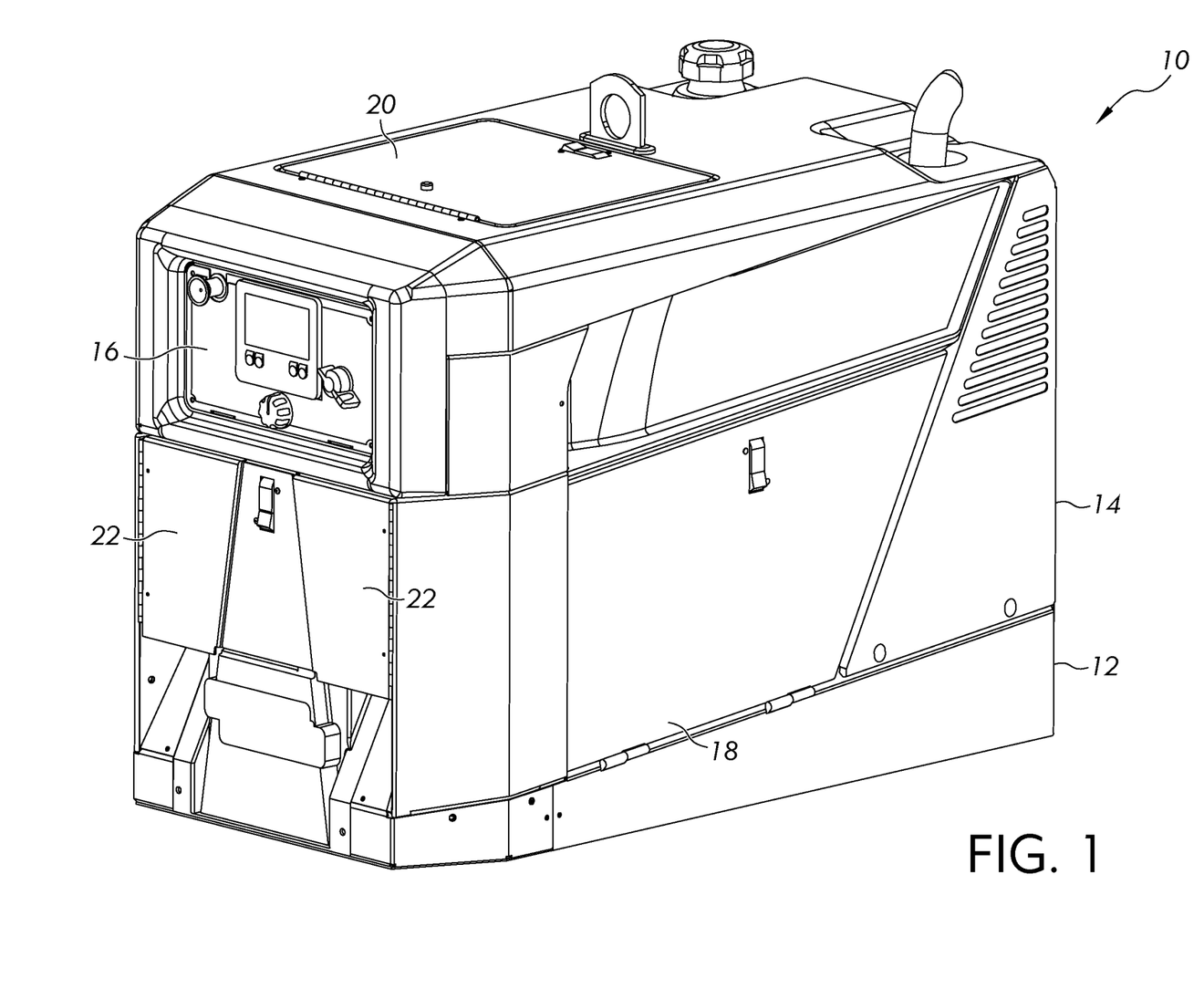
FIG. 1 is a perspective view of an engine driven welder.

FIG. 1 is an outer perspective view of an example engine driven electrical power generation apparatus, such as a welding machine 10. The welding machine 10 includes a base 12 that is part of a chassis structure for the welding machine, and an outer case or enclosure 14. A user interface 16 for controlling the operation of the welding machine 10 is located on the front side of the outer case 14. Example welding processes that can be performed by the welding machine include SMAW, GMAW, FCAW, MCAW and GTAW processes and arc gouging.

The case 14 includes various access doors. Doors 18 along the left and right lateral sides of the welding machine 10 provide access to an engine compartment. In certain embodiments, the doors 18 are hinged at their bottom edges, allowing the doors 18 to swing downward. The doors 18 can be easily removable from the hinges, so that they can be relocated away from the welding machine 10 when accessing the engine compartment. A door 20 on the top of the welding machine 10 also provides access to the engine compartment. The top door 20 can be aligned with an air filter housing for the engine, so that the air filter can be readily inspected and replaced.

One or more doors 22 on the front side of the welding machine 10 provide access to various electrical outputs of the welding machine. For example, auxiliary power receptacles and welding torch connections can be accessed via the doors 22 on the front of the welding machine 10.

Figure 2:
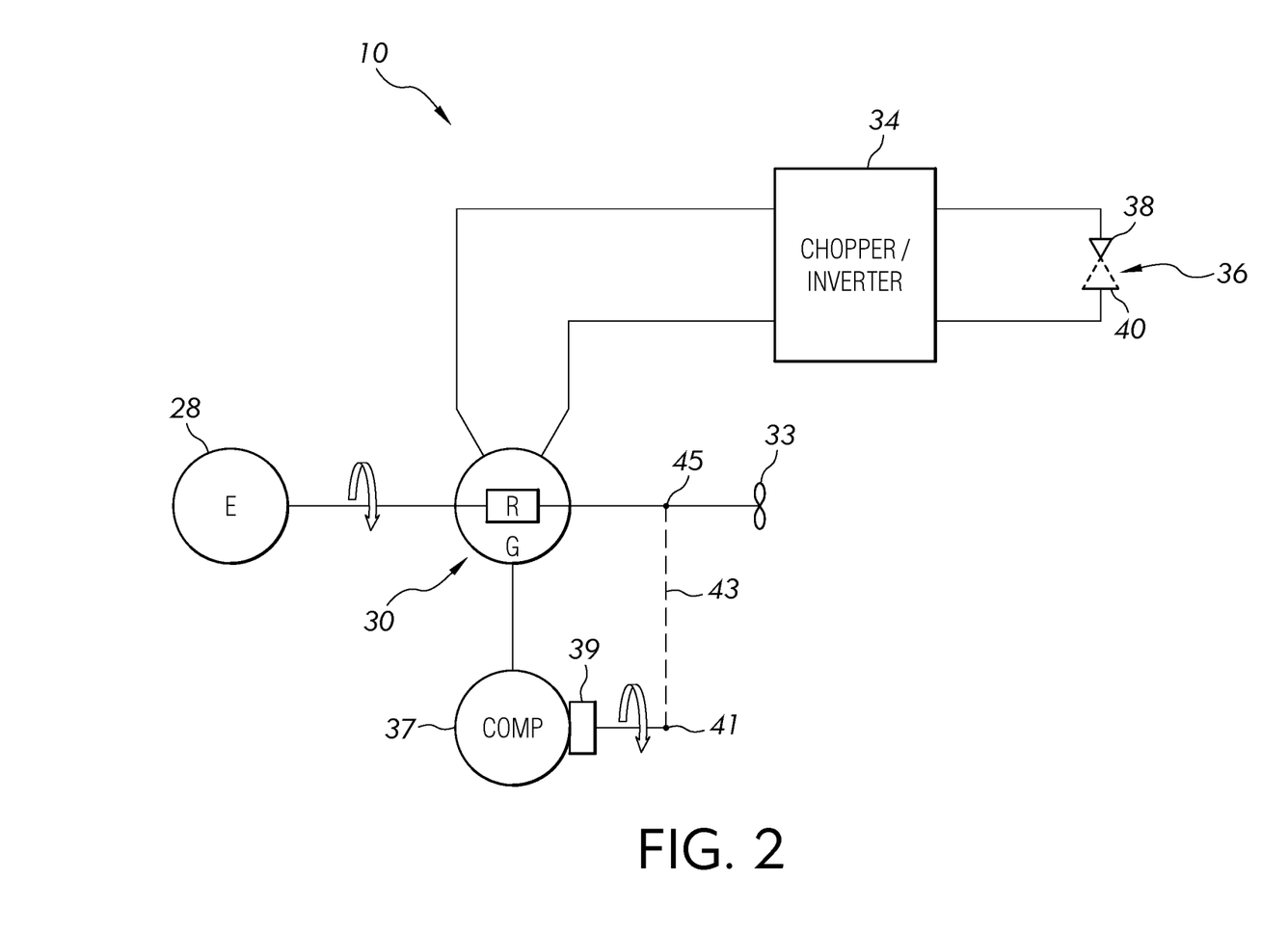
FIG. 2 is a block diagram of an engine driven welder having an air compressor as an auxiliary load.

FIG. 2 is a schematic block diagram of the welding machine 10. An internal combustion engine 28 is coupled to a generator 30 to drive the generator. In particular, the driveshaft of the engine 28 is coupled to the generator's rotor shaft 35. The engine 28 and generator 30 can be mounted in-line and coaxially coupled so that they operate at the same rotational speed, or coupled via a speed-altering device, such as a pulley or gear system. The generator 30 can be an AC generator (e.g., an alternator) or DC generator. The generator 30 is operatively connected to an arc generation power supply, such as a welding power supply 34, and supplies electrical energy to the welding power supply. The welding power supply 34 converts the electrical energy from the generator 30 to a welding output or welding waveform during a welding operation, to generate a welding arc 36 between a torch 38 and workpiece(s) 40 to be welded. The welding power supply 34 can include a chopper or inverter circuitry for generating the welding output, control circuitry for controlling the chopper or inverter circuitry, and may include a transformer and one or more rectifiers. The welding power supply 34 can further include heat sinks to help cool the welding power supply, such as by air pulled into the welding machine by a fan powered by the engine or generator. The specific construction of welding power supplies is well known to one of ordinary skill in the art and will not be discussed in detail herein.

At the distal end of the generator 30, just behind its end casting, is a fan 33 and pulley 45. The fan 33 and pulley 45 are mounted on or otherwise driven by the rotor shaft 35 of the generator 30. The engine 28 drives the generator's rotor shaft 35. As the engine 28 turns the rotor shaft 35, both the fan 33 and pulley 45 are also driven by the engine.

The welding machine 10 can include an air compressor 37, which may be a rotary screw compressor, piston compressor, vane compressor, and the like. The air compressor 37 can include a clutch 39, such as an electromagnetic clutch, to engage and disengage the air compressor. The air compressor 37 can further include a driven pulley 41, chain ring, gear, etc. for powering the air compressor by the output of the engine, such as via a drive belt 43, drive chain, etc. The clutch 39 and driven pulley 41 form a selectively engageable pulley or clutch mechanism that couples the rotor shaft 35 of the generator 30 to the air compressor 37 to selectively drive the air compressor by the rotor shaft. In certain embodiments, the air compressor 37 is driven by the engine 28 via a drive pulley 45 attached to the proximal side of the fan 33 (e.g., between the fan blades and the generator end casting). The drive pulley 45 and the fan 33 can be integrally formed, such as via a single casting, or otherwise attached (e.g., welded or bolted together). When the fan 33 rotates while the clutch 39 on the air compressor 37 engaged, engine power is transferred to the air compressor 37 via the drive belt 43, which couples the drive pulley 45 on the fan to the driven pulley 41 on the air compressor. The fan 33 helps to cool the generator 30, the air compressor 37 and other components within the welding machine enclosure.

The engine 28 and generator 30 are resiliently mounted to the chassis structure of the welding machine 10 via vibration isolators (e.g., rubber or elastomeric mounts) to limit the amount of vibration transferred from the engine and generator to the chassis structure. If the air compressor 37 were to be attached directly to the chassis structure, there can be relative motion between the generator 30 and the air compressor due to vibration of the generator. Relative motion between the generator 30 and the air compressor 37 is undesirable because it complicates the tensioning requirements of the drive belt 43. To address this problem, the air compressor 37 in the present invention is attached directly to the end casting of the generator 30. This mounting system for the air compressor 37 simplifies the tensioning requirements of the drive belt 43 and in certain instances may make a tensioning device (e.g., a belt tensioner having an idler pulley) unnecessary. Relative motion between the air compressor 37 and generator 30 is minimized and alignment of pulleys or sprockets in the drive system for the air compressor can be precise. By attaching the air compressor 37 to the generator's 30 end casting, both the air compressor and generator 30 are isolated from the chassis structure of the welding machine 10 via vibration isolators located between the generator and the chassis structure. The air compressor 37 can be bolted to the end casting of the generator 30 via a bracket as described further below, or a single casting could be used for the generator end casting and a portion of the air compressor.

Figure 3:
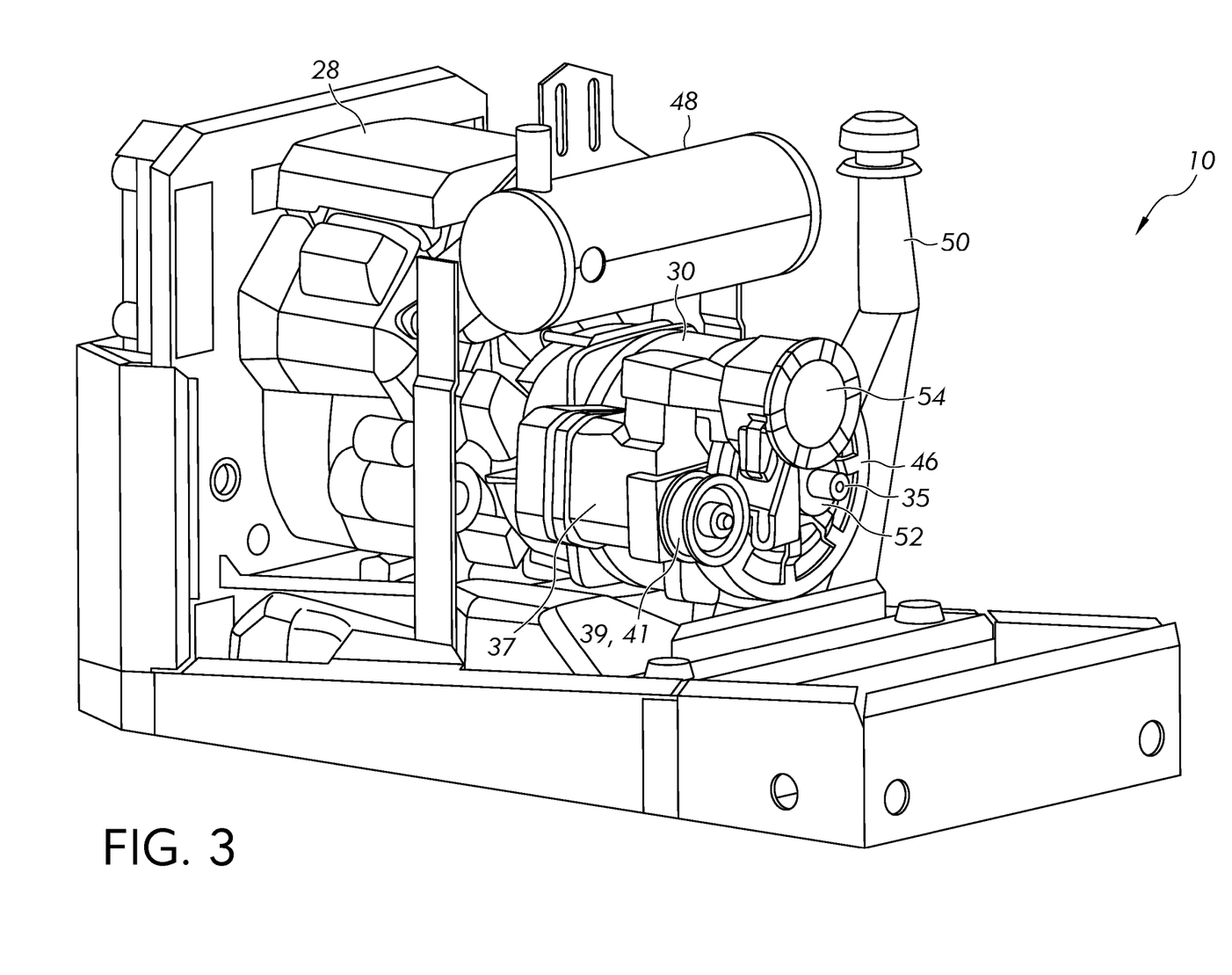
FIG. 3 is an internal view of portions of the engine driven welder.

FIG. 3 shows an internal view of the welding machine 10. The engine 28 is located at the front or proximal end of the welding machine, just behind an internal wall of bulkhead of the machine's chassis structure. In front of the bulkhead is an electronics compartment containing the welding power supply. Behind the engine 28 and mounted coaxial therewith is the generator 30. The engine 28 and generator 30 are mounted within the engine compartment of the welding machine 10. The engine compartment also includes the air compressor 37, which is mounted to the end casting 46 of the generator 30 and extends forward along one lateral side of the generator. In the example embodiment shown in the figures, the air compressor 37 is a rotary screw compressor. Also located within the engine compartment are a muffler 48 and fuel tank 50. Although not shown in FIG. 3, an oil separator and filter assembly, and an aftercooler that cools air discharged from the air compressor 37, can be located within the engine compartment. The clutch 39 and driven pulley 41 assembly for powering the air compressor 37 is shown in FIG. 3. However, the fan and drive pulley are not shown in FIG. 3 and would be mounted to the distal end of the generator's rotor shaft 35. The generator's rotor shaft 35 passes through the end casting 46. The end casting 46 is located at a distal end of the generator 30 opposite the internal combustion engine, and the end casting includes a rotor shaft bearing 52 that supports the rotor shaft 35. The air compressor 37 can include an intake air filter 54 for removing particulates from the intake air prior to compression.

Figure 4:
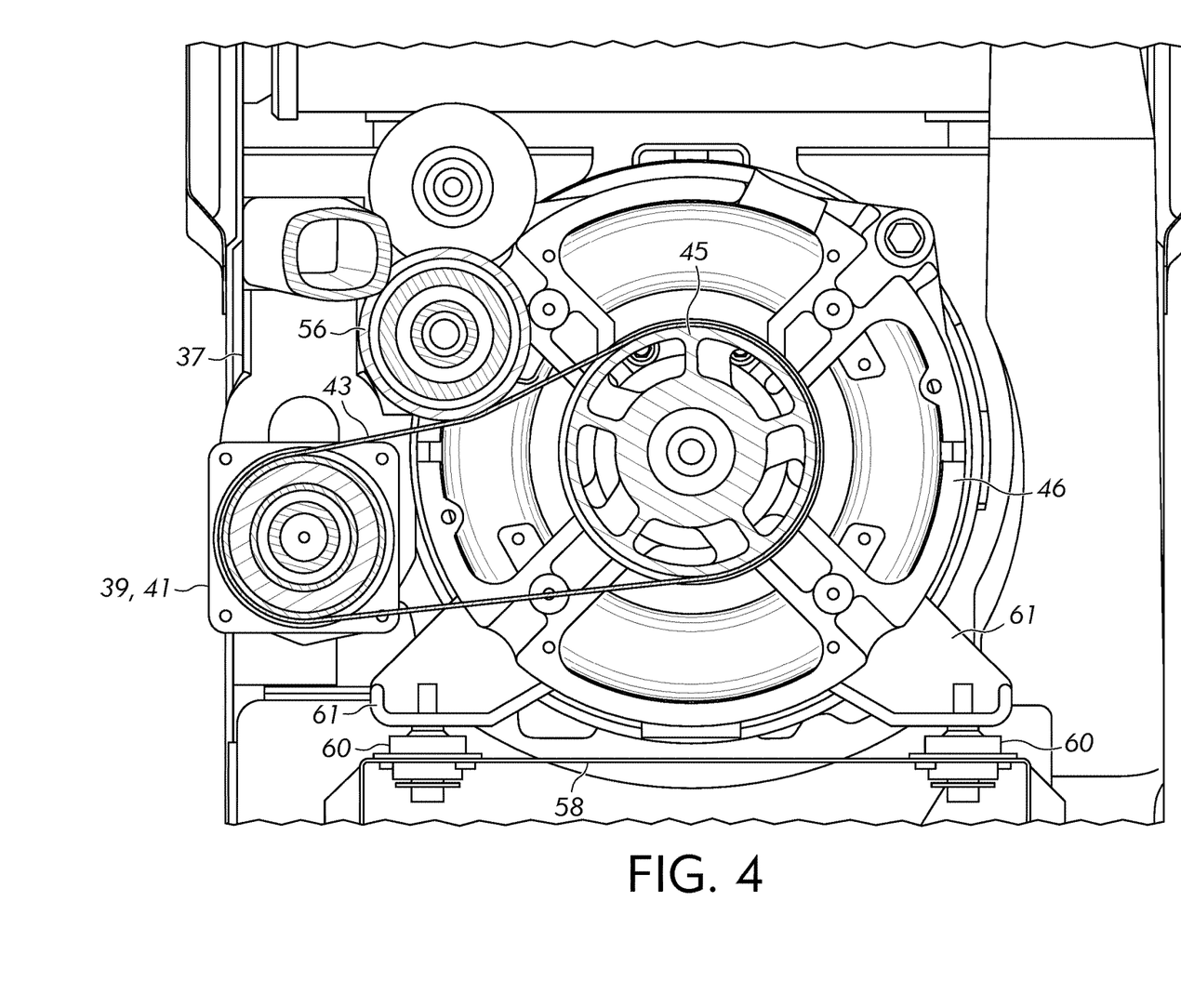
FIG. 4 is an internal view of portions of the engine driven welder.

FIG. 4 shows the drive system for the air compressor 37. The drive pulley 45 that is attached to the generator's rotor shaft is shown without the attached fan, so that the drive pulley and drive belt 43 can be clearly seen. When the clutch 39 is engaged, the drive pulley 45 powers the air compressor 37 via the drive belt 43 and driven pulley 41. It can be seen that the drive pulley 45 is slightly larger than the driven pulley 41. In an example embodiment, the drive pulley 45 has a diameter of 5.14 inches and the driven pulley has a diameter of 3.33 inches, however other sizes or size ratios between the two pulleys is possible depending on the operating speed of the engine and the air compressor 37. In an embodiment, the drive pulley 45 operates at engine speed which can be in the range of 2500 to 3600 RPM, although other engine/drive pulley speeds are possible. The air compressor 37 can optionally include a belt tensioner 56 having an idler pulley that applies a tensioning force to the drive belt 43, to ensure that the drive belt is properly tensioned. The belt tensioner 56 can mounted to the end casting 46 of the generator, like the air compressor 37, or at other suitable locations near the drive belt 43.

As discussed above, the air compressor 37 is attached directly to the end casting 46 of the generator. In an example embodiment, the air compressor 37 includes one or more compressor mounting brackets that removably attach to the end casting 46. The chassis structure of the welding machine includes a mounting bracket 58 for the generator, to which the end casting 46 is attached using vibration isolators 60. The end casting 46 has mounting feet 61 that project downward from the circular main body of the end casting. The end casting mounting feet 61 rest on and are attached to the vibration isolators 60. The vibration isolators 60 are located between the end casting 46 and the mounting bracket 58 for the generator and serve to isolate both the generator and the air compressor 37 from the chassis structure of the welding machine, so that the air compressor and generator can move together and not relative to one another, which helps to keep the drive 45 and driven 41 pulleys properly aligned during operation.

Figure 5:
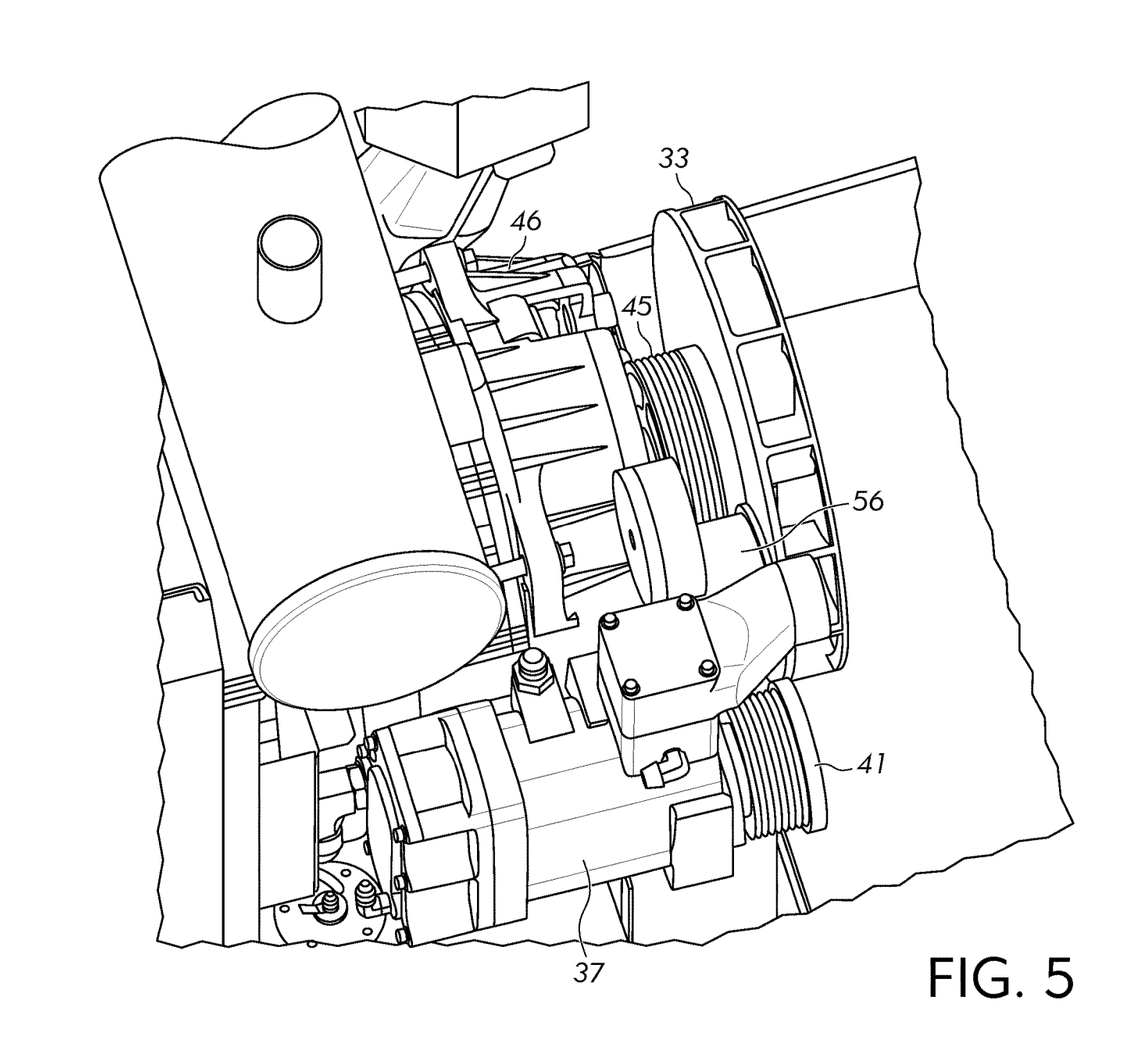
FIG. 5 is a perspective view of the air compressor, a generator, and a fan on the engine driven welder.

FIG. 5 shows a downward perspective view of the air compressor 37 mounted to the generator's end casting 46 at the distal end of the generator. The drive pulley 45 mounted on the generator's rotor shaft and the attached fan 33 are also shown. The drive pulley 45 and fan 33 are distal of the end casting 46. The belt tensioner 56 mounted to the end casting 46 and the driven pulley 41 are shown in FIG. 5, however the drive belt is not shown.

Figure 6:
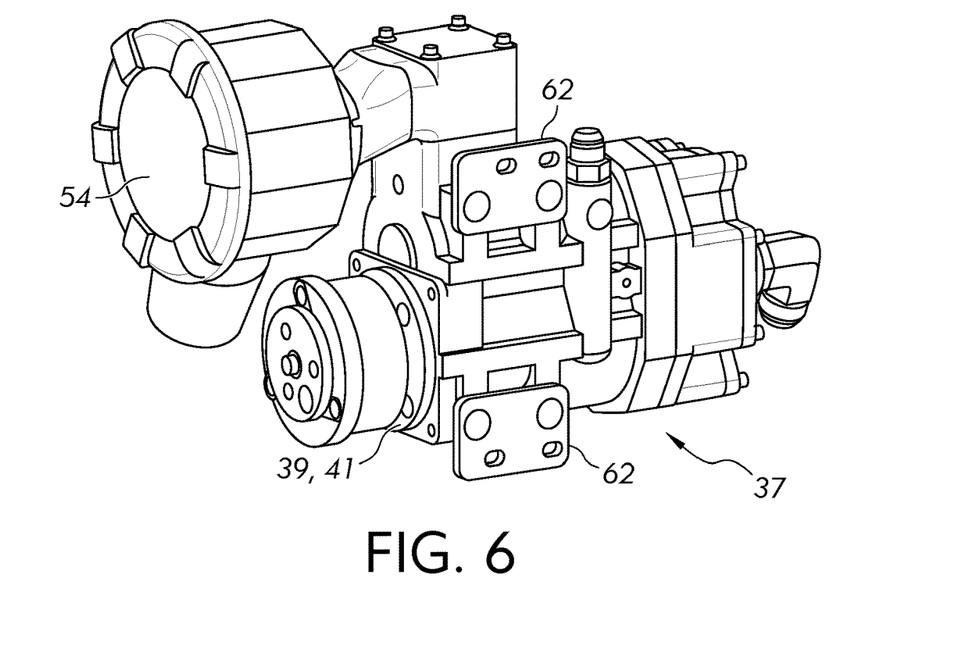
FIG. 6 is a perspective view of the air compressor.

FIG. 6 is a perspective view of the air compressor 37 showing the lateral side of the air compressor that is adjacent to the generator. The air compressor 37 includes one or more compressor mounting brackets 62. The compressor mounting brackets 62 are attached to the compressor housing via fasteners, welds, or other known attachment mechanisms. Alternatively, the compressor mounting brackets 62 can be integrally formed with the compressor housing. The compressor mounting brackets 62 are attached to the end casting of the generator, to mount the air compressor to the end casting, using fasteners such as screws, bolts, etc. The end casting can include complementary mounting surfaces to which the compressor mounting brackets 62 are mated. The air compressor's air intake filter 54 is also shown in FIG. 6. The air intake filter 54 includes an outer housing with appropriate filter media located within the housing.

Figure 7:
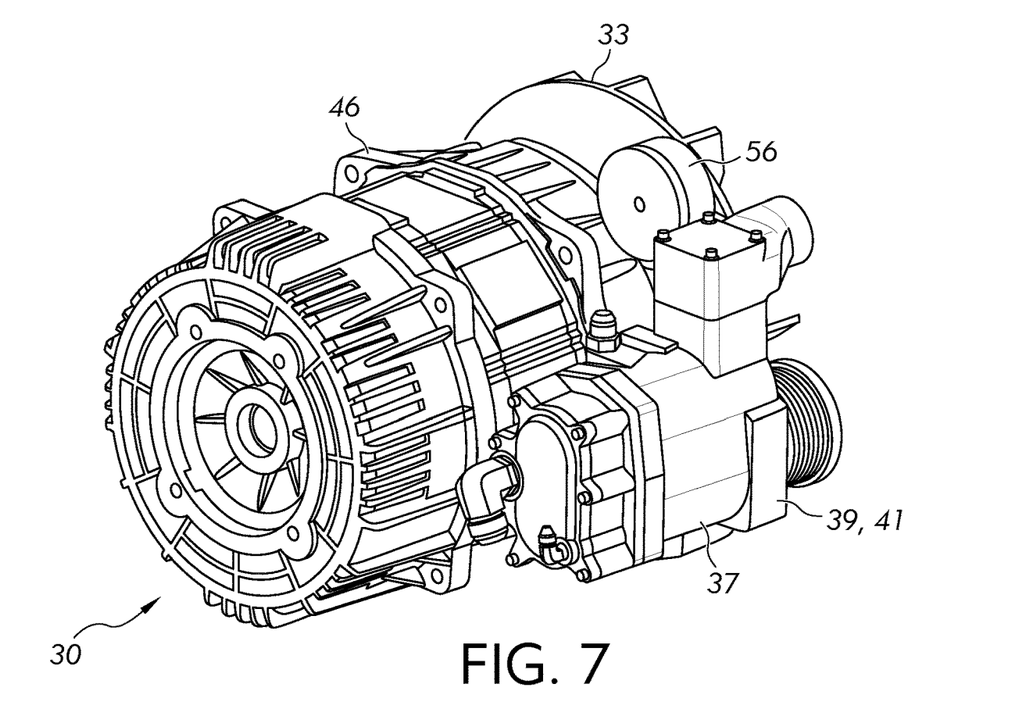
FIG. 7 is a perspective view of the air compressor and generator.
Figure 8:
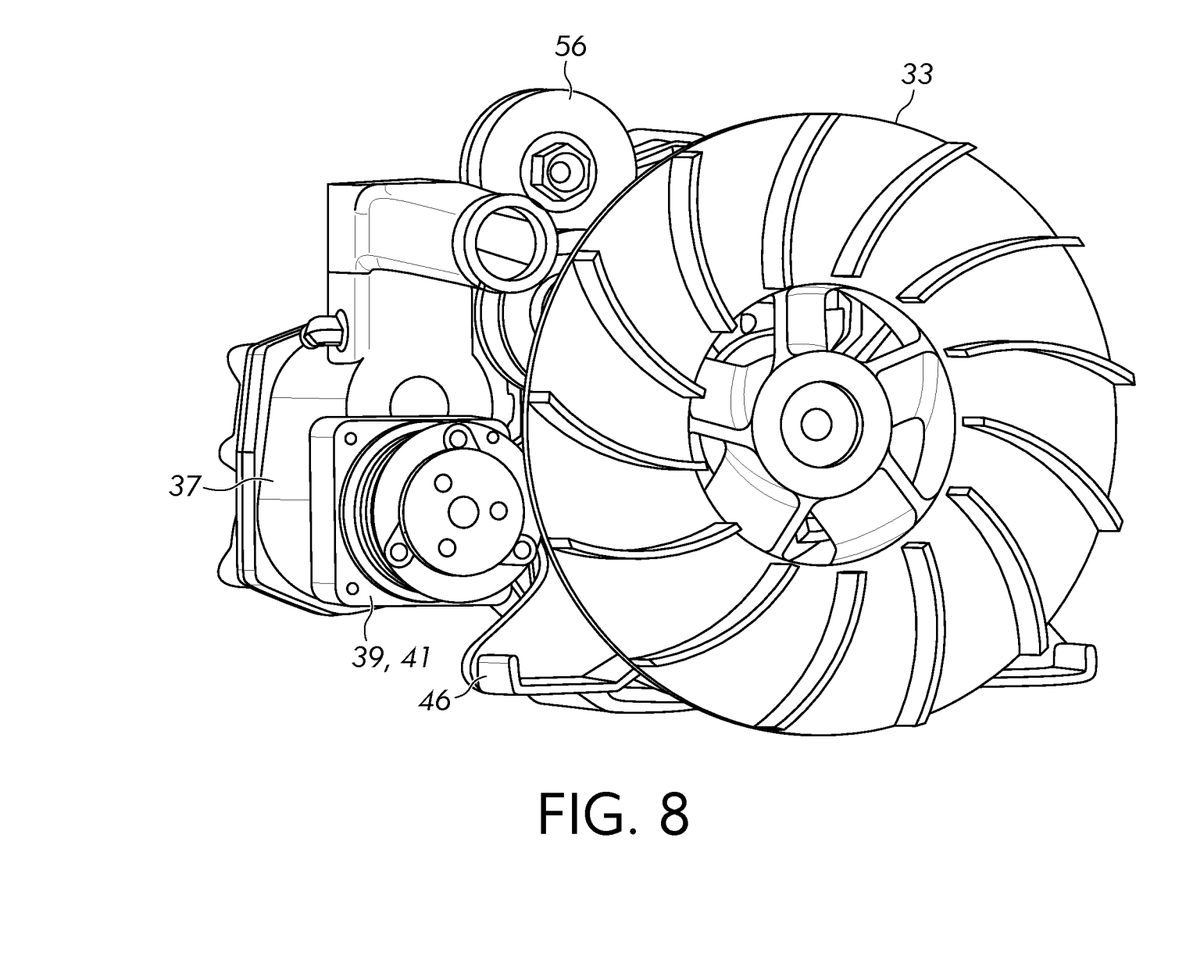
FIG. 8 is a perspective view of the air compressor and fan.

FIGS. 7 and 8 provide perspective views of the generator 30, the air compressor 37, and the fan 33 without the drive belt attached. The generator's end casting 46 to which the compressor mounting brackets are attached can be seen in FIGS. 7 and 8. The belt tensioner 56 and clutch 39 and driven pulley 41 assembly are also shown.

Figure 9:
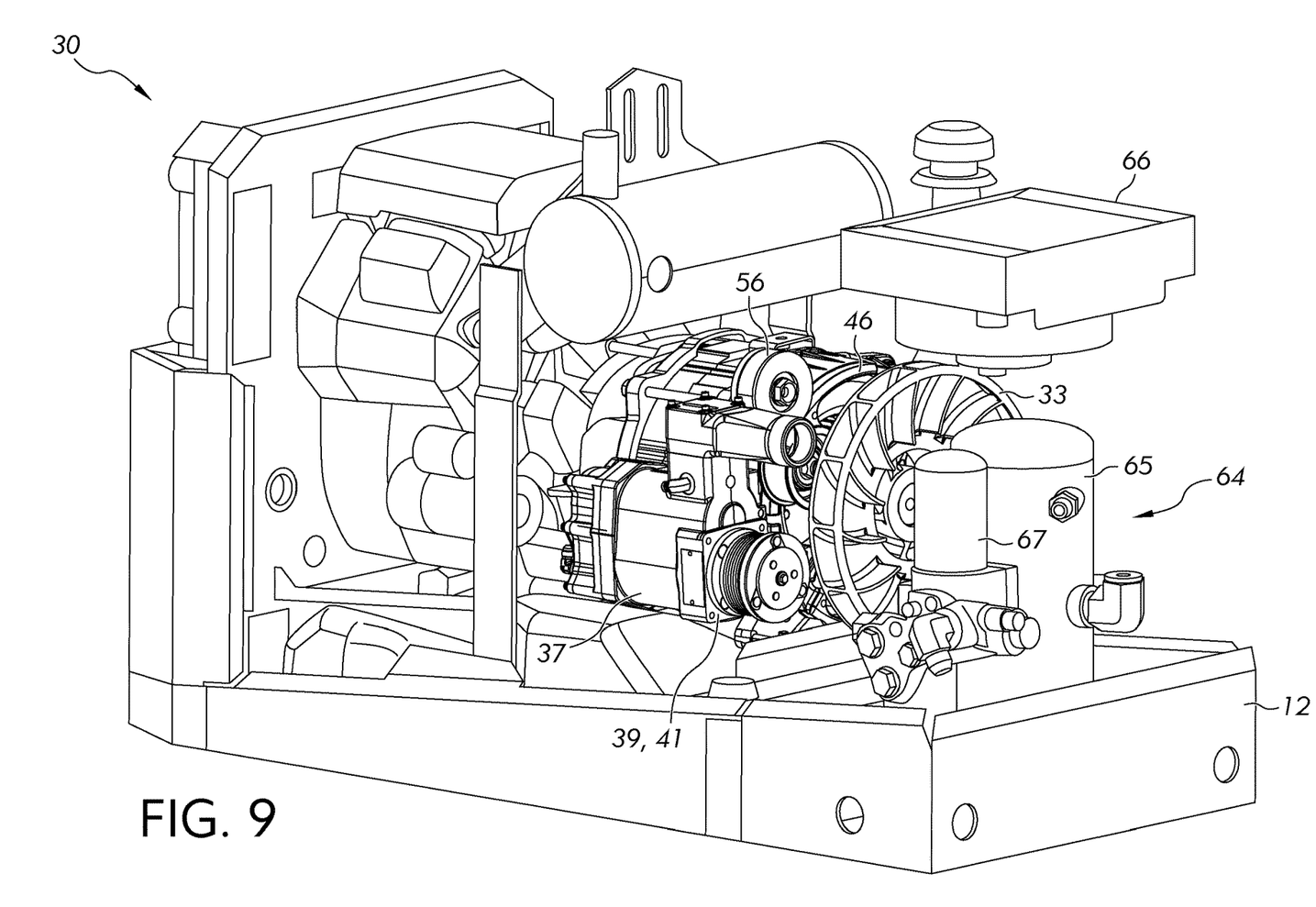
FIG. 9 is an internal view of portions of the engine driven welder that include an aftercooler and an oil separator and filter assembly for the air compressor.

As noted above, the air compressor can be a rotary screw compressor. The rotary screw compressor can utilize lubricating oil that is injected into the compressor to lubricate and seal the compressor screws (e.g., male and female rotors), and to cool the compressor. With reference to FIG. 9, the welding machine 10 can include an oil separator and filter assembly 64 and an aftercooler 66 for the rotary screw compressor 37. The oil separator and filter assembly 64 separates oil from the compressed air discharged from the air compressor 37. Compressed air from the air compressor 37 is mixed with the lubricating oil, and the mixture of compressed air and lubricating oil flows from the air compressor 37 to the oil separator and filter assembly 64. The oil separator and filter assembly 64 can include a separator tank 65 that slows the velocity of the compressed air, allowing the lubricating oil that is mixed with the compressed air to drop out by gravity. The separator tank 65 can function as an oil reservoir for the air compressor 37, and the lubricating oil can be recirculated from the separator tank 65 to the air compressor. The oil separator and filter assembly 64 can include an oil filter for filtering recirculated lubricating oil before it is injected into the air compressor 37. The oil separator and filter assembly can further include a coalescing filter 67 that removes additional lubricating oil particles from the compressed air via a membrane material. The lubricating oil removed by the coalescing filter 67 can be returned to the separator tank 65 or to the air compressor 37 via an oil scavenge line that extends between the coalescing filter and the air compressor. In an example embodiment, the oil separator and filter assembly 64 is located distal of or behind the end casting 46 of the generator and the fan 33 that is attached to the drive pulley for the air compressor 37. The oil separator and filter assembly 64 can be located within the welding machine enclosure 14 (FIG. 1) and in the base 12 of the welding machine. The aftercooler 66 cools the compressed air and can include an electric fan powered by the generator, and a heat exchanger. The aftercooler 66 can be located at the top of the welding machine enclosure above the oil separator and filter assembly 64, or in another suitable position.

Figure 10:
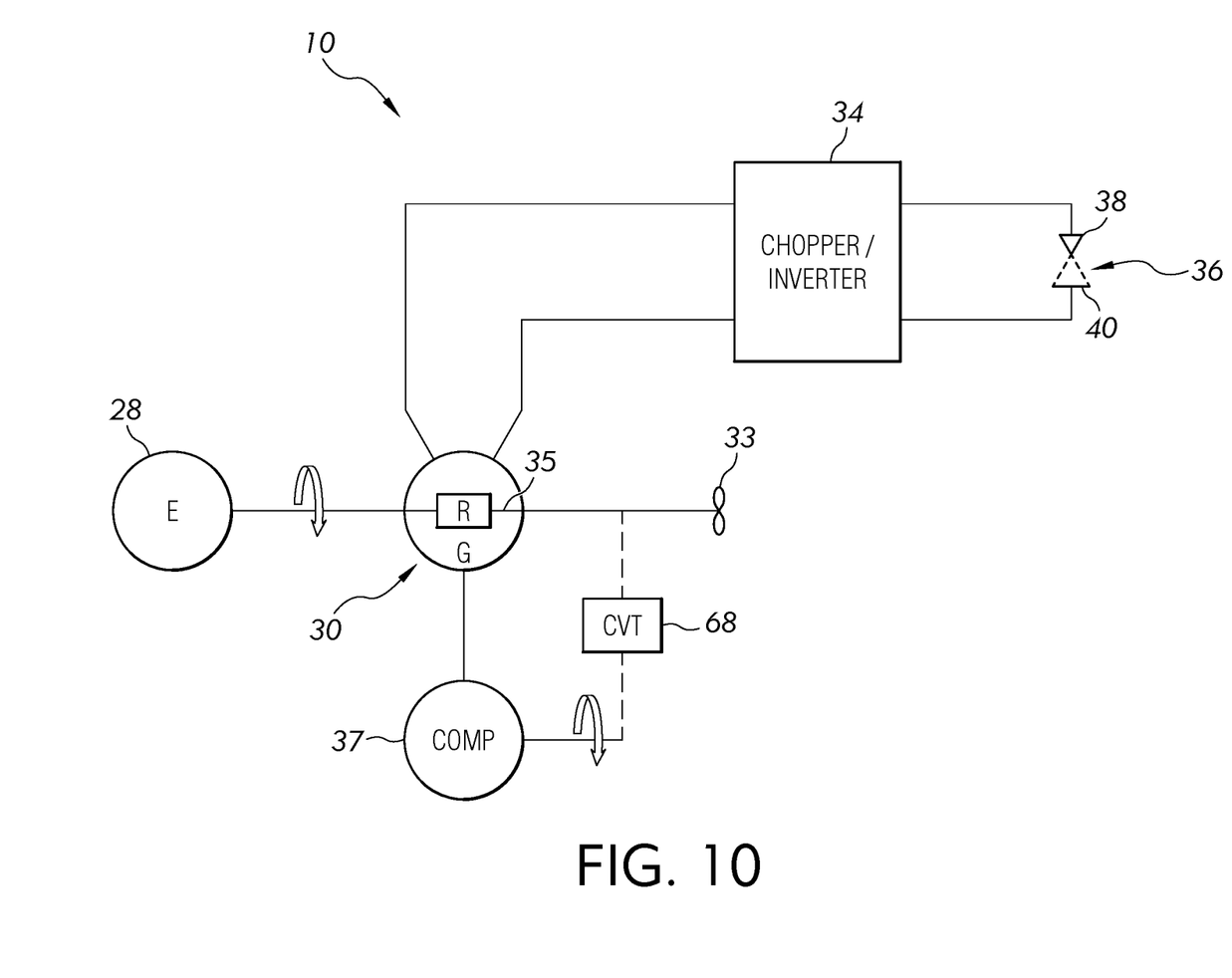
FIG. 10 is a further block diagram of an engine driven welder having an air compressor as an auxiliary load.

The output pressure and air flow (e.g., psi and cfm) of the air compressor is proportional to the operating speed of the compressor. The speed of the engine can change with load. For example, when no welding is occurring but the air compressor is in use, the engine may run at a first speed and then increase its speed when welding begins. When the engine speeds up, the pressure and air flow from the air compressor will also increase, along with the power consumed by the compressor. This may be undesirable if the total load on the engine approaches its maximum output. In certain embodiments, the welding machine can include variable drive ratio between the drive pulley and the driven pulley on the air compressor, to keep the compressor speed relatively constant despite changes to engine speed. For example, a continuously variable transmission (CVT) can be provided between the rotor shaft of the generator and the air compressor for adjusting the drive ratio between the rotor shaft and the air compressor. FIG. 10 is a schematic block diagram of the welding machine 10 that includes a CVT 68 coupling the rotor shaft 35 to the air compressor 37. The CVT 68 provides for a variable drive ratio between engine speed and the air compressor 37 speed, which can allow the total power output of the engine and its fuel economy to be optimized. The welding machine can include an engine control unit or other electronic controller that is operatively connected to the CVT 68 to adjust the drive ratio. The welding machine could include devices other than a CVT to adjust the drive ratio between the engine 28 and the air compressor 37, such as a fluid transmission or a magnetic coupling, changeable pulleys, or a chain or belt drive like a bicycle for example. The CVT 68 can include a clutch mechanism to selectively engage and disengage the air compressor 37.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A welding machine, comprising:
    a welding power supply that generates a welding waveform during a welding operation;
    an internal combustion engine;
    a generator operatively connected to the welding power supply to supply electrical energy to the welding power supply, wherein the generator comprises a rotor shaft driven by the internal combustion engine, and an end casting located at an end of the generator opposite the internal combustion engine;
    a rotary screw compressor mounted to the end casting of the generator; and
    a clutch mechanism that couples the rotor shaft to the rotary screw compressor to selectively drive the rotary screw compressor by the rotor shaft,
    wherein the end casting includes a rotor shaft bearing that supports the rotor shaft.

2. The welding machine of claim 1, further comprising a vibration isolator attached to the end casting that isolates both of the generator and the rotary screw compressor from a chassis structure of the welding machine.

3. The welding machine of claim 1, further comprising a compressor mounting bracket attached to the end casting and the rotary screw compressor, for mounting the rotary screw compressor to the end casting.

4. The welding machine of claim 1, further comprising a continuously variable transmission (CVT) for adjusting a drive ratio between the rotor shaft and the rotary screw compressor.

5. The welding machine of claim 1, further comprising an oil separator and filter assembly located distal of the end casting of the generator within an enclosure for the welding machine.

6. The welding machine of claim 5, further comprising an aftercooler that cools air discharged from the rotary screw compressor.

7. A welding machine, comprising:
    a chassis structure;
    a welding power supply that generates a welding waveform during a welding operation;
    an internal combustion engine;
    a generator operatively connected to the welding power supply to supply electrical energy to the welding power supply, wherein the generator comprises a rotor shaft driven by the internal combustion engine, and an end casting located at an end of the generator opposite the internal combustion engine;
    a rotary screw compressor mounted to the end casting of the generator;
    a selectively engageable pulley that couples the rotor shaft to the rotary screw compressor to selectively drive the rotary screw compressor by the rotor shaft; and
    a vibration isolator that isolates both of the generator and the rotary screw compressor from the chassis structure, wherein the end casting includes a rotor shaft bearing that supports the rotor shaft, and further wherein the vibration isolator is attached to the end casting.

8. The welding machine of claim 7, further comprising a compressor mounting bracket attached to the end casting and the rotary screw compressor, for mounting the rotary screw compressor to the end casting.

9. The welding machine of claim 7, further comprising a continuously variable transmission (CVT) for adjusting a drive ratio between the rotor shaft and the rotary screw compressor.

10. The welding machine of claim 7, further comprising an oil separator and filter assembly located distal of the end casting of the generator within an enclosure for the welding machine.

11. The welding machine of claim 10, further comprising an aftercooler that cools air discharged from the rotary screw compressor.

12. A welding machine, comprising:
    a welding power supply that generates a welding waveform during a welding operation;
    an internal combustion engine;
    a generator operatively connected to the welding power supply to supply electrical energy to the welding power supply, wherein the generator comprises a rotor shaft driven by the internal combustion engine, and an end casting located at a distal end of the generator opposite the internal combustion engine, wherein the end casting includes a rotor shaft bearing that supports the rotor shaft;
    a rotary screw compressor mounted to the end casting of the generator; and
    a clutch mechanism on the rotary screw compressor that couples the rotor shaft to the rotary screw compressor to selectively drive the rotary screw compressor by the rotor shaft.

13. The welding machine of claim 12, further comprising a vibration isolator attached to the end casting that isolates both of the generator and the rotary screw compressor from a chassis structure of the welding machine.

14. The welding machine of claim 12, further comprising a compressor mounting bracket attached to the end casting and the rotary screw compressor, for mounting the rotary screw compressor to the end casting.

15. The welding machine of claim 14, further comprising:
a drive belt extending between the clutch mechanism and a pulley attached to the rotor shaft; and
a belt tensioner comprising an idler pulley that tensions the drive belt, wherein the belt tensioner is attached to the end casting of the generator.

16. The welding machine of claim 12, further comprising a continuously variable transmission (CVT) for adjusting a drive ratio between the rotor shaft and the rotary screw compressor.

17. The welding machine of claim 12, further comprising an oil separator and filter assembly located distal of the end casting of the generator within an enclosure for the welding machine.

18. The welding machine of claim 17, further comprising an aftercooler that cools air discharged from the rotary screw compressor.

* * * * *